US 6,615,375 B1

(12) United States Patent
Mounes-Toussi et al.

(10) Patent No.: US 6,615,375 B1
(45) Date of Patent: Sep. 2, 2003

(54) METHOD AND APPARATUS FOR TOLERATING UNRECOVERABLE ERRORS IN A MULTI-PROCESSOR DATA PROCESSING SYSTEM

(75) Inventors: Farnaz Mounes-Toussi, Minneaplis, MN (US); Nicholas A. Poleschuk, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,589

(22) Filed: Feb. 3, 2000

(51) Int. Cl.⁷ .................................................. G06F 11/00
(52) U.S. Cl. .................................. 714/54; 714/5; 714/6
(58) Field of Search ........................... 714/21, 11, 12, 714/764, 5, 54, 6, 20; 711/147, 148, 149, 150, 151, 152, 153

(56) References Cited

U.S. PATENT DOCUMENTS

| | | | |
|---|---|---|---|
| 4,044,337 A | | 8/1977 | Hicks et al. ............... 364/200 |
| 4,538,265 A | | 8/1985 | Day et al. .................. 371/12 |
| 4,924,466 A | | 5/1990 | Gregor et al. ............... 371/12 |
| 5,119,488 A | | 6/1992 | Takamatsu et al. .......... 395/575 |
| 5,406,504 A | * | 4/1995 | Denisco et al. .............. 700/90 |
| 5,495,570 A | | 2/1996 | Heugel et al. .......... 395/182.09 |
| 5,720,029 A | | 2/1998 | Kern et al. ............ 395/182.18 |
| 5,727,150 A | | 3/1998 | Laudon et al. ......... 395/200.08 |
| 5,768,623 A | * | 6/1998 | Judd et al. .................. 710/37 |
| 5,771,247 A | | 6/1998 | Allen et al. ................. 371/40.1 |
| 5,870,537 A | | 2/1999 | Kern et al. ............. 395/182.04 |
| 5,881,282 A | | 3/1999 | Shipman .................... 395/652 |
| 5,892,970 A | | 4/1999 | Hagersten ................... 395/825 |
| 5,933,653 A | | 8/1999 | Ofek ........................ 395/826 |
| 5,946,709 A | | 8/1999 | Arimilli et al. ............. 711/119 |
| 6,029,231 A | * | 2/2000 | Blumenau ................... 709/217 |
| 6,088,815 A | * | 7/2000 | West et al. .................. 711/162 |
| 6,151,685 A | * | 11/2000 | Li et al. ..................... 711/114 |
| 6,243,794 B1 | * | 6/2001 | Casamatta ................... 711/153 |
| 6,260,069 B1 | * | 7/2001 | Anglin ....................... 709/229 |
| 6,275,900 B1 | * | 8/2001 | Liberty ....................... 711/120 |
| 6,282,610 B1 | * | 8/2001 | Bergsten ..................... 711/114 |
| 6,449,731 B1 | * | 9/2002 | Frey, Jr. ........................ 714/9 |
| 2002/0124143 A1 | * | 9/2002 | Barroso et al. ............. 711/145 |

OTHER PUBLICATIONS

A. Gefflaut, C. Morin, and M. Banatre, Tolerating Node Failures in Cache Only Memory Architectures, 1994, IEEE.*
Daniel Lenoski, Kourosh Gharachorloo, James Laudon, Anoop Gupta, John Hennessy, Mark Horowitz and Monica Lam, Design of Scalable Shared–Memory Multiprocessors: The DASH Approacd, 1990, IEEE.*
D.L. Hecht, K. M. Kavi, R.K. Gaede, and C. Katsinis, Fault–Tolerance Using Cache–Coherent Distributed Shared Memory Systems.*
Saulsbury et al., "COMA Machines Can Be Easily Built", http:www.sics.se/%7Eans/simple–coma/isca–94/paper.html, 10 pages.
SEQUENT, "Sequent's NUMA–Q SMP Architecture", http://www.sequent.com/products/highend_src/smp_wp3/html, 9 pages.
SEQUENT, "Sequent's NUMA–Q SMP Architecture", http://www.sequent.com/products/highend_src/smp_wp3/html, 12 pages.

* cited by examiner

Primary Examiner—Robert Beausoliel
Assistant Examiner—Marc Duncan
(74) Attorney, Agent, or Firm—Moser, Patterson & Sheridan L.L.P (57) ABSTRACT

A directory-based multi-processor computer system is provided with a mechanism for tolerating errors by providing the capability of checking data for errors and, if an error is detected, determining if another valid copy of the data is in the system. If another copy of the data is available, then the data is provided to the processor/memory controller that requested the data, without the need to generate an interrupt.

35 Claims, 4 Drawing Sheets

METHOD AND APPARATUS FOR TOLERATING UNRECOVERABLE ERRORS IN A MULTI-PROCESSOR DATA PROCESSING SYSTEM

BACKGROUND OF THE INVENTION

1. Field of the Invention

The present invention relates generally to the field of computer systems and, more particularly, to a structure and a method of tolerating data errors in multi-processor systems.

2. Background of the Related Art

Multi-processing computer systems generally include two or more processors which may be employed to perform computing tasks. A particular computing task may be performed upon one processor while the other processor(s) performs unrelated processing tasks. Alternatively, components of a particular task may be distributed among multiple processors to decrease the time required to perform the computing task. Generally speaking, a processor is a device configured to perform an operation upon one or more operands to produce a result. The operation is performed in response to an instruction executed by the processor.

Multi-processor computer systems with a single address-base and coherent caches offer a flexible and powerful computing environment. The single address-base and coherent caches together ease the problem of data partitioning and dynamic load balancing. The single address-base and coherent caches also provide better support for parallelizing compilers, standard operating systems, and multi-programming, thus enabling more flexible and effective use of the machine.

One structure for multi-processing computer systems is a distributed memory architecture. A distributed memory architecture typically includes multiple nodes each having one or more processors and a memory. The nodes are coupled to a network which allows communication between the nodes. When considered as a whole, the combined memory of all the nodes forms a "shared memory" which can be accessed by each node. Typically, directories are used to identify which nodes have copies of data corresponding to a particular address. Coherency of the data is maintained by examination of the directories to determine the state of data.

Illustrative directory-based cache coherency architectures that have emerged include Cache-Coherent Non-Uniform Memory Access (CC-NUMA) and Cache-Only Memory Architecture (COMA), for example. Both CC-NUMA and COMA architectures have a distributed memory, a scalable interconnection network, and directory-based cache coherence. Distributed memory and scalable interconnection networks provide the required scalable memory bandwidth, while directory-based schemes provide cache coherence. In contrast to CC-NUMA architectures, COMA architectures convert a per-node main memory into a large secondary or tertiary cache, which is also called Attraction Memory (AM). The conversion occurs by adding tags to cache-line size partitions of data in the main memory. As a consequence, the location of a data item in the system is decoupled from the physical address of the data items, and the data item is automatically migrated or replicated in main memory depending on a memory reference pattern.

Unfortunately, in both COMA and NUMA architectures, data may be corrupted, resulting in errors in memory. Such errors occur because memory, as an electronic storage device, may return information that is different from what was originally stored. In general, two kinds of errors can typically occur in a memory system: repeatable (hard) errors and transient (soft) errors. A hard error is often the result of a hardware fault and is relatively easy to diagnose and correct because it is consistent and repeatable. A soft error occurs when a bit reads back the wrong value once, but subsequently functions correctly.

The only protection from memory errors is to use memory error detection or correction protocol. Some protocols can only detect errors in one bit of an eight-bit data byte while others can detect errors in more than one bit automatically. Other protocols can both detect and correct single and/or multi-bit memory problems.

Common error detection/correction mechanisms include parity, error correcting code (ECC), and the like. It is well known in the art to use parity and error correcting code (ECC) to validate the reliability of data transferred between a central processing unit (CPU) and a memory, programmed input/output (PIO) device, or the like. Further, ECC is used to recover from certain data errors in memory.

When parity checking is enabled, each time a byte is written to memory, a logic circuit called a parity generator/checker examines the byte and determines whether the data byte had an even or an odd number of ones. If it had an even number of ones, the ninth (parity) bit is set to a one, otherwise it is set to a zero. Thus, no matter how many bits were set to one in the original eight data bits, the nine bits together make up an odd number of ones. This mechanism is referred to as odd parity. When the data is read back from memory, the parity circuit acts as an error checker. It reads back all nine bits and determines again if there are an odd or an even number of ones. If there are an even number of ones, there is likely an error in one of the bits. When a parity error is detected, the parity circuit generates an interrupt, which instructs the processor to halt to ensure that the incorrect memory does not corrupt executing or executable processes.

Parity checking provides single-bit error detection, but does not correct memory errors. Further, parity checking merely determines the existence of an error without correcting the error. ECC not only detects both single-bit and multi-bit errors, but can also correct single-bit or multi-bit errors. ECC uses a special algorithm to encode information in a block of bits that contains sufficient detail to permit the recovery of a single or multi-bit error in the protected data. The correction of a single or multi-bit error is dependent upon the ECC algorithm used. When ECC detects an uncorrectable error, it generates an interrupt that instructs the system to shut down to avoid data corruption.

One problem with conventional error detection/correction mechanisms is that the frequency of system interrupts is still higher than desirable. Interrupts may cause a system or a processor reset, depending on the nature of the failure and the software capabilities of the system. Interrupts are undesirable because of the resulting system downtime, lost data and lost productivity.

Therefore, there remains a need for a structure and a technique for detecting errors while minimizing system interrupts. The system should be capable of detecting single or multiple bit errors and still avoid a system interrupt.

SUMMARY OF THE INVENTION

The present invention generally provides a method and system adapted to check data for errors and, if an error is detected, determine if a valid copy of the data is available within the system.

In one aspect of the invention, a method of transferring data in a directory-based data processing system is provided. The method comprises the steps of: accessing, by the requesting device, the data contained in a local memory associated with the requesting device, determining whether an error condition exists in the data; and if an error condition exists, requesting the data from a remote memory. In one embodiment, requesting the data from a remote memory comprises first accessing a directory to determine the state of the data. If the state indicates that the data is available at the remote memory, a request is placed on an interconnect coupling the requesting device and the remote memory.

In another aspect of the invention, a data processing system includes a first node having a first processor, a first memory and a directory, a second node having a second processor and a second memory and an interconnect coupling the first and second nodes. The data processing system is adapted to perform a process comprising: accessing, by the first processor, data contained in the first memory; determining whether an error condition exists in the data; and if an error condition exists, requesting the data from the second memory.

In yet another aspect of the invention, a directory-based data processing system having a distributed shared memory is provided. The data processing system comprises: a first node including at least a first processor, a first memory, a first memory controller and a first directory containing state data for one or more memory blocks of the first memory; a second node including at least a second processor, a second memory, a second memory controller and a second directory containing state data for one or more memory blocks of the second memory; and an interconnect connecting the first node and the second node. The first memory controller is configured to access data contained in the first memory and determine whether an error condition exists in the data and, if an error condition exists, place a request for the data on the interconnect.

These and other features and objects of this invention will be apparent to those skilled in the art from a review of the following detailed description and the accompanying drawings.

DETAILED DESCRIPTION OF A PREFERRED EMBODIMENT

The present invention generally provides a method and system adapted to check data for errors in a multi-processing environment and, if an error is detected, determine if a valid copy of the data is available in the system. If a valid copy of the data is available, then the data is provided to the device (e.g., processor and/or memory controller) that requested the data, without the need to generate an interrupt. The present invention advantageously increases system availability by generating a system interrupt only if no remote copies of the requested memory block exists.

In one embodiment, a requesting device (e.g., a memory controller) issues a memory read request, indicating data stored in a specific memory location is desired. The memory controller determines if a valid copy of the requested memory block is resident in an associated memory. The associated memory may be cache memory or non-cache memory (e.g., main memory). If the memory block is resident and valid, the memory controller responsively provides to the requesting processor a copy of the requested data block. Otherwise, a remote copy of the memory block is requested.

A requesting memory controller may receive a memory block and perform any necessary error detection and correction routines. In the event of unrecoverable errors within the received memory block, the requesting memory controller requests a remote copy of the memory block. In one embodiment, the associated requesting processor then begins processing the remote memory block prior to a determination of whether a non-recoverable error condition exists.

Although reference is made herein to particular system architectures, such as NUMA and COMA, the invention is not limited to a particular architecture. Reference to particular architectures is merely illustrative. In general, the invention has applicability in any multi-processor directory-based system.

Figure 1:
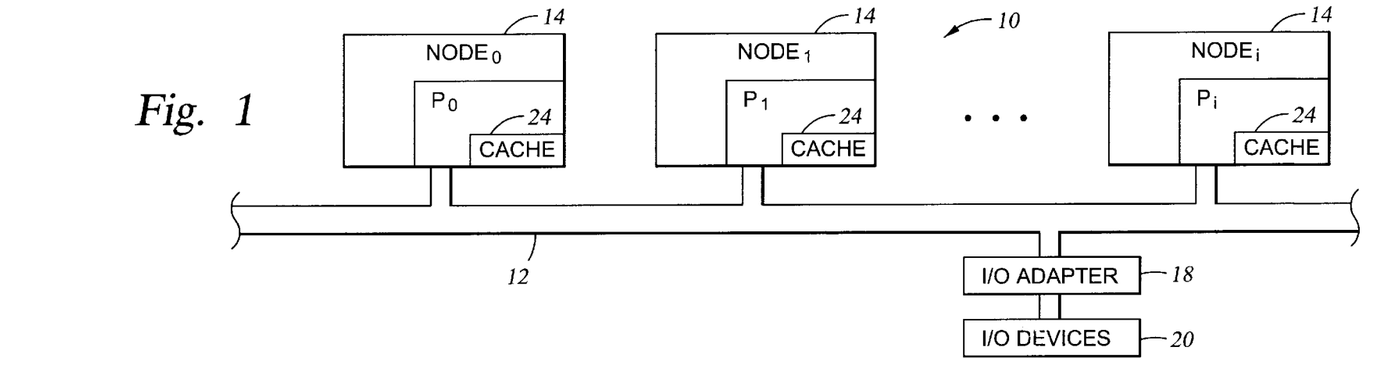
FIG. 1 is a block diagram of a multiple processor system in which the present invention may find application.

FIG. 1 is a schematic block diagram of a general multi-processor system 10 such as a NUMA system in which the present invention may find application. A system interconnect 12 couples a plurality of nodes 14, such as Node0 through Nodei, each node including at least one processor, such as P0 through Pi. Each of the processors P0 through Pi has associated therewith a cache memory 24 which may include any number of cache levels. The system 10 further includes an I/O adapter 18, and various I/O devices 20. Various cache coherency schemes, known and unknown in the art, may be used to ensure that the latest valid version of data is used by any of the processors P0 through Pi.

Figure 2:
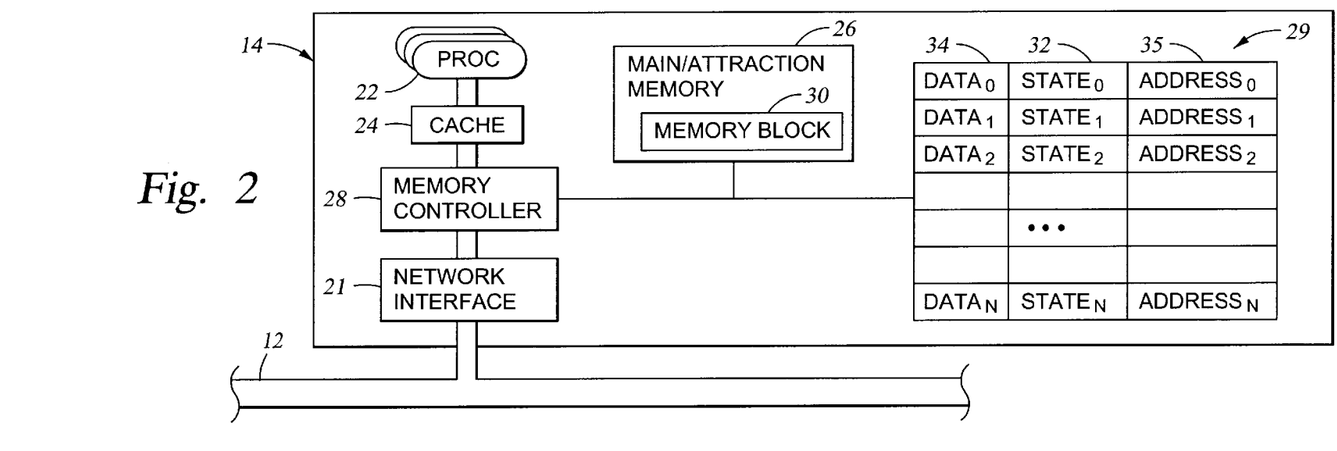
FIG. 2 is a detail block diagram of a node of FIG. 1.

FIG. 2 provides further details of the node 14 coupled to the system interconnect 12. A network interface 21 provides the circuitry required to connect the node 14 to the interconnect 12. The node 14 also includes at least one processor 22 (corresponding to a processor Pi of FIG. 1) associated with cache 24 which may include primary or on-board cache as well as one or more off-chip or lower level caches. The particular cache architecture is not limiting of the invention. The node 14 further includes a memory 26, which may be a main memory, as in a NUMA system, or an attraction memory, as in a COMA system, for example. A memory controller 28 supports the communications cache coherency functions and error checking of the node 14. Although shown separately, it is understood that in other embodiments the memory controller 28 and the processor 22 may be considered an integrated processing unit configured to perform memory control functions and data processing.

The memory 26 is arranged in memory blocks, as exemplified by a memory block 30. Each node 14 includes a directory 29 containing entries for the memory blocks of the memory 26 for each node 14 coupled to the interconnect 12. In the case of a NUMA-type architecture, the directory 29 includes a state field 32 and a data field 34. The data field 34 corresponds to a unique address block (e.g., memory block 30) within memory 26. The state field 32 includes information as to whether data in the data field 34 is up-to-date whether the data is resident in the particular node 14 requesting the data (i.e., is a local copy) or is resident elsewhere in other nodes 14 (i.e., is a remote copy). As used herein, a remote copy refers to data located in the memory of a node 14 other than the node requesting the data. The remote data may reside in any form of a memory device accessible to the local memory device requesting the data. For example, the remote data may be resident in the cache or main memory of a processor on another node 14 connected to the interconnect 12.

In the case of a COMA-type architecture, the directory 29 also includes an address field 35. The address field 35 is provided for architectures wherein numerous data pieces may be mapped to a particular memory block 30 at any given time. As a result, it is necessary to maintain an address field 35 in the directory 29 in order to track the location of data.

In one embodiment, the "state" of a cache may be determined by a MESI protocol. A cache data block in MESI protocol is in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. If a sector is in any of the Modified, Shared, or Invalid states, it can move between the states depending upon the particular bus transaction. While a sector in an Exclusive state can move to any other state, a sector can only become Exclusive if it is first Invalid. The MESI protocol is well-known, but a further understanding may be had by reference to commonly assigned U.S. Pat. No. 5,946,709, incorporated herein by reference. Additionally, the invention is not specific to a particular protocol and MESI is merely illustrative of one protocol which may be used to advantage.

Figure 3:
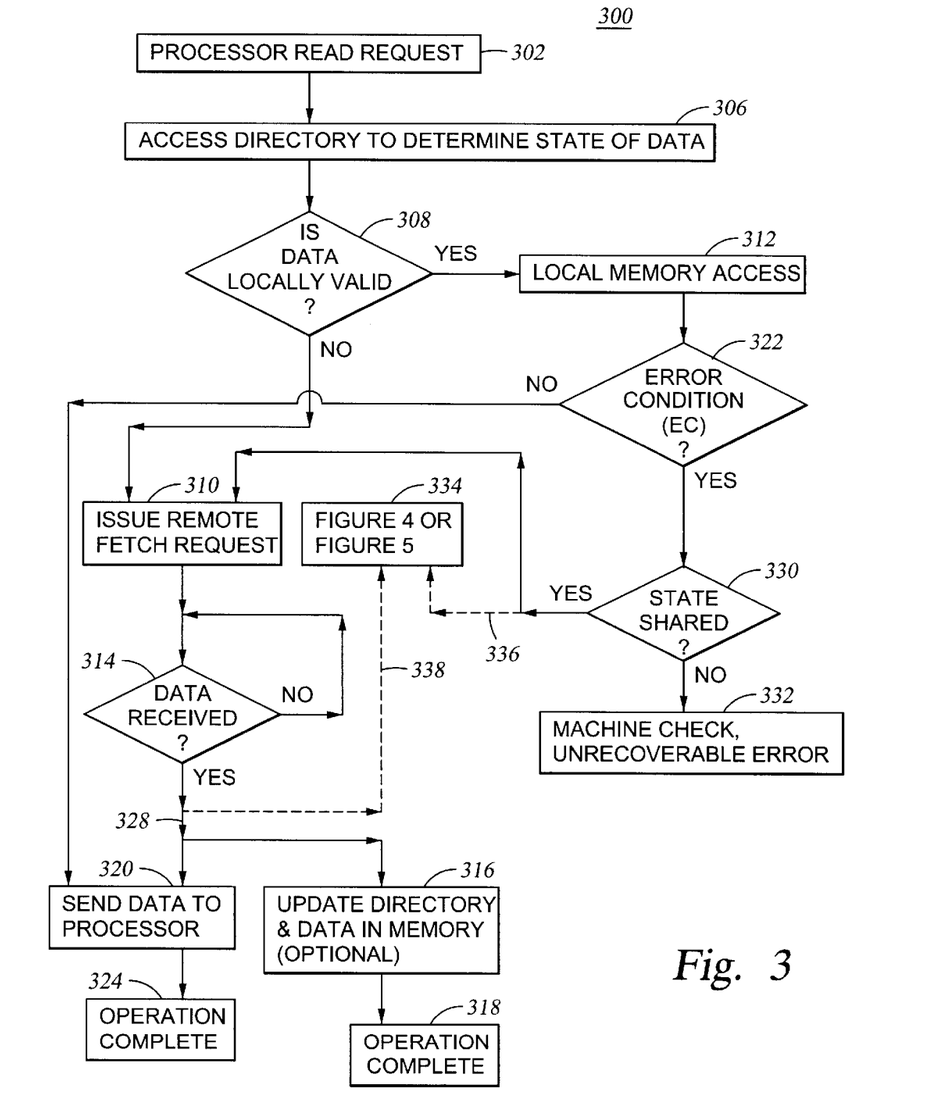
FIG. 3 is a simplified logic flow diagram of the method of the present invention.

FIG. 3 is a flow diagram showing a process 300 utilized by the present invention. At step 302, the process 300 begins and the processor 22 of interest issues a memory request (i.e., a read or fetch) instruction. At step 306, the memory controller 28 accesses and examines the directory 29 that is used to keep track of the state of each memory block 30 in memory 26. At step 308, the memory controller determines if the requested data is locally valid. That is, a determination is made as to whether the local data (i.e., the data contained in the memory associated with the requesting processor) is valid. By "valid" is meant that the data is not modified by another processor on a different node 14. If the requested data is valid and available locally, then the method proceeds to step 312 where the local data is accessed.

If the requested data is not valid or available locally, then the process proceeds to step 310. In step 310 a remote fetch request is issued by the memory controller 28 to acquire a remote copy of the data. In step 314 the method 300 queries whether the data has been received. The process 300 continues to loop through step 314 until the remote data has been received. Once the remote data is received in step 314, the method 300 proceeds along logic line 328 indicating that the data is sent to the processor 22 in step 320. The operation is complete in step 324.

Optionally, the local memory directory is updated in step 316 (data may be written to main memory or attraction memory) after the data is received in step 314. The process 300 is then complete in step 318. Subsequent requests for the data by the same memory controller/processor can then access the data locally (step 312).

In one embodiment, error checking may be performed after the remote copy is sent to the processor in step 320. Thus, if it is determined that the data has been received at step 314, the data is sent to the processor in step 320 and the method 300 continues as the processor begins processing. If a parity checker determines that there is a parity error for the received data, then a data correction algorithm may be performed. If there is no error in the received data, the data is forwarded to the execution unit in the processor. Accordingly, the received data provided by the memory controller is determined to be valid and the data is forwarded to the execution unit without the latency normally associated with the parity and ECC operations which occur in the memory controller in known systems.

If a local memory access was performed at step 312, then an error determination is made at step 322. If an error condition is not present (or is correctable by conventional means such as ECC), then the data is provided to the processor 22 in step 320, and the operation is complete in step 324.

If the local data includes an error condition not correctable by conventional methods, then the method 300 proceeds to step 330 and queries whether a remote copy of the data is available. In an embodiment using MESI protocol, for example, the method 300 would determine whether the state of the data is shared. If the data is available at a remote location, then the method 300 proceeds with step 310, where a fetch request is issued to retrieve the remote copy of the data. If the data is not resident remotely (step 330), then a machine check interrupt is issued in step 332 and data processing is stopped while diagnostic routines or the like are run. Thus, the present invention determines if a data error has occurred and in the event of an uncorrectable data error, acquires a copy of the data elsewhere if it is available.

The present invention may also include additional features of data error identification, as described below with regard to FIGS. 4 and 5. Methods 400 and 500 of FIGS. 4 and 5, respectively, may be carried out within a block 334 of FIG. 3. Block 334 proceeds from step 314 along logic line 338 once the requested data is received and from step 330 along logic line 336 in the case of an error condition in local data having a shared state. In one embodiment, the method 300 proceeds along logic lines 336 and 338 in parallel with the steps proceeding from logic line 328. Accordingly, the data received from the remote fetch issued at step 310 may be processed before an error determination is made, as was described above. Further, the use of parity and ECC in the methods 400, 500 is merely illustrative. It should be understood that the present invention does not require the use of parity, ECC or any other particular detection mechanism; some indication of a data error is all that is needed.

Figure 4:
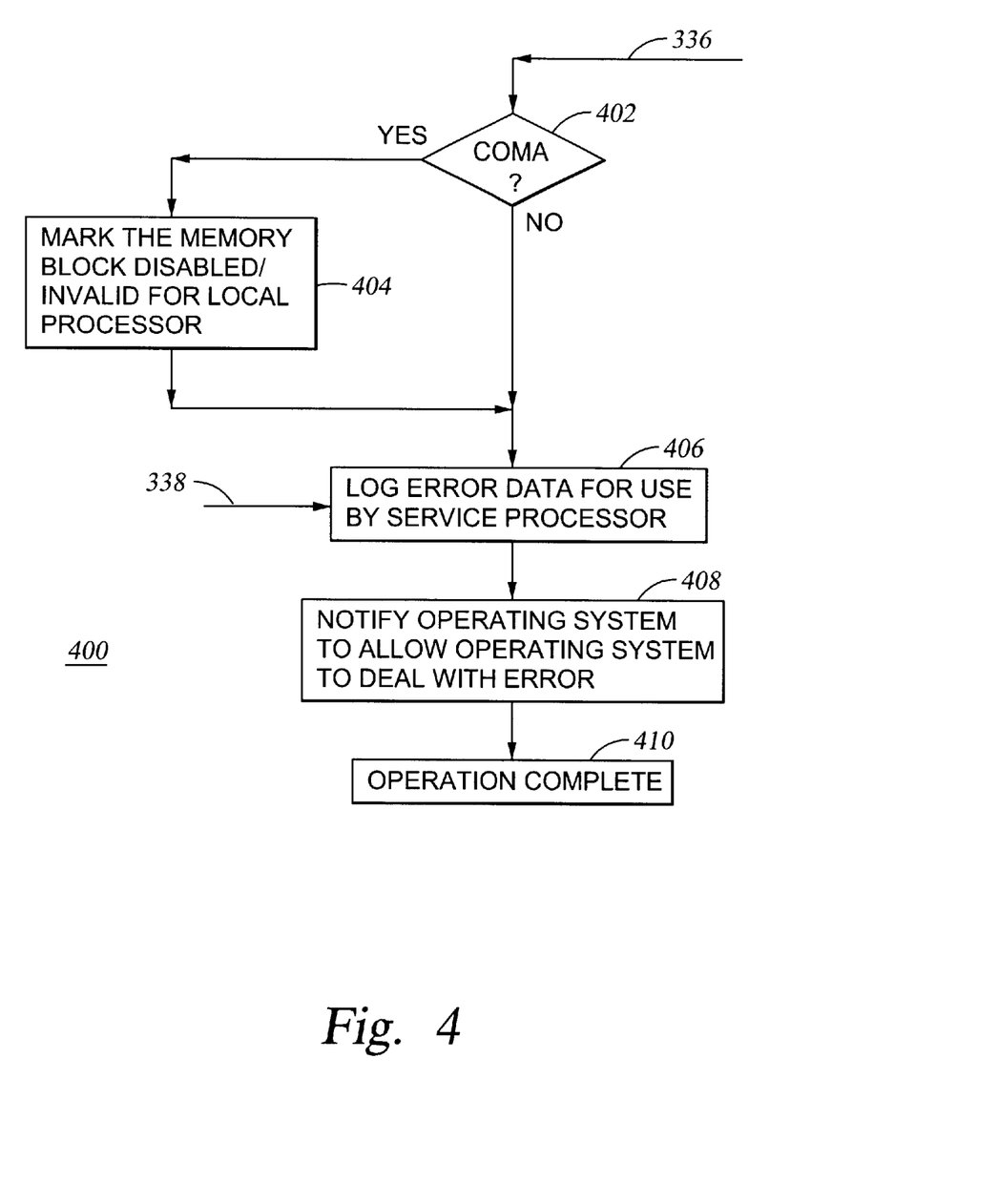
FIG. 4 is a logic flow diagram showing additional details of the method of FIG. 3.

Referring first to FIG. 4, logic line 336 (from step 330) proceeds to step 402 which queries whether the system is a COMA-type system, as opposed to NUMA-type or other system. If the system is a COMA-type, then in step 404 the memory block is marked as disabled or invalid for the local processor. Step 404 is an optional step which may be performed in cache-only systems having hardware capable of dynamically reallocating data. Step 404 provides a mechanism by which higher-speed hardware components may monitor invalid data. In either case, the method continues with step 406 in which the system logs the error for use by a service processor to determine the failing Field Replaceable Unit (FRU). The system can determine a failing card or DIMM, for example, by knowing what bit(s) failed. In one embodiment, failing bits are determined by comparing failed local data (all data bits and parity or ECC bits) with good data received from the remote fetch request in step 310 via optional path 338. Bits contained in the local data which cannot be matched to the presumably good data from the remote fetch are considered to be failing. Failing bits due to an uncorrectable error (UE) are not normally known; hence known systems are typically not able to isolate a failing card/memory module in a system where data is spread across multiple cards or memory modules.

Once this error data is logged in step 406, then the operating system is notified in step 408 to allow the operating system to deal with the error. For example, the operating system may thus be able to end the current task of accessing failing area of memory before a fatal error occurs.

Figure 5:
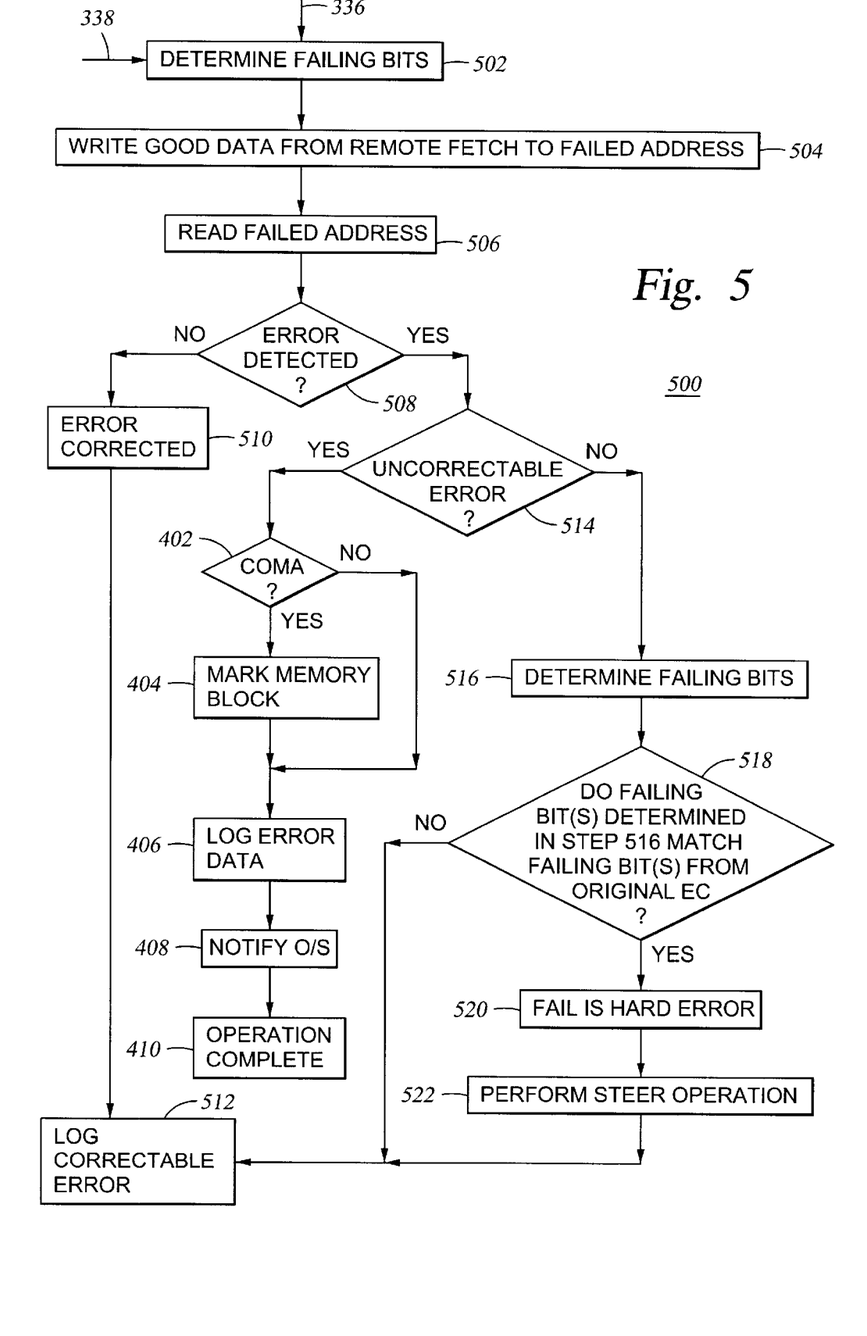
FIG. 5 is another logic flow diagram showing an alternative logic flow to FIG. 4.

The method of FIG. 5 provides an alternative method for block 334. In step 502, the requesting node determines specifically which bits accessed in step 312 are bad. In one embodiment, step 502 is accomplished in the manner described above with respect to step 406 of FIG. 4. That is, processor/memory controller compares the failed local data (all data bits and error detection bits, e.g., parity or ECC bits) received in step 312 with the good data received from the remote fetch request in step 310. Bits contained in the local data which cannot be matched to the presumably good data from the remote fetch are considered to be failing. In step 504, the memory controller writes to the address that had the bad data with presumably good data from the remote fetch of step 310. In step 506, the memory controller then reads from the address just written to and, in step 508, performs error detection. If no error is detected, the method proceeds with step 510 with an indication that the error has been corrected, and logs that a correctable error has occurred in step 512.

If an error is detected in step 508, then the memory controller determines if the error is uncorrectable in step 514. An uncorrectable error indicates that the errors contained in the data are unchanged or have worsened. If the error is uncorrectable, the process continues as described with regard to FIG. 4. Thus, step 402 determines whether the system is a COMA-type system, and, if so, marks the memory block in step 404. Regardless of the system architecture, the method 500 proceeds to log the error data in step 406, notify the operating system in step 408, and complete the operation in step 410.

A correctable error at step 514 indicates that at least a portion of the failing bits have been corrected by steps 502–506 and the remaining failing bits detected at step 508 are equal to or less than the number of bits correctable by the correction mechanism of the memory controller. Accordingly, after correcting the remaining failing bits, the method 500 may then be exited.

However, in the embodiment shown in FIG. 5, the method 500 then determines whether any portion of the bits that failed at step 508 are due to hard errors, i.e., whether the same bits are repeatedly failing. At step 516, the method 500 determines which bits are bad. That is, the data received from step 506 is compared to the data received from the remote data fetch issued at step 310. Bits contained in the data received from step 506 which are not contained in the remote data are presumably bad bits.

Subsequently, at step 518, a comparison is made as to whether any of the bad data bits determined in step 516 match any of the original bad data bits, i.e., the bad bits determined in step 502. If the failing bit(s) do not match, then one or more of the failing bits at step 508 are different from those that failed in step 322 indicating that a soft error occurred. The method 500 then continues to step 512 to log that a correctable error has occurred.

If the data bits match at step 518, then step 520 notes that the failure is a hard error. That is, the failure is due to an error on bit(s) repeatedly failed since the initial error condition at step 322 and were not corrected by steps 502–504. In one embodiment, shown by step 522, the memory controller then performs a steer operation, (if supported on the system), to replace bit(s) failing with a hard error. Steering uses a redundant data bit which is selected to replace a failing data bit detected during a memory operation. After a bit is steered, a steer cleanup operation is performed. A steer cleanup fetches data using the original data bit, corrects the data utilizing ECC and then writes the corrected data back to the same address using the redundant data bit. Accordingly, the steer operation reduces the possibility for subsequent errors due to hard failing bits. Although a steer operation is preferred, the invention contemplates using other correction mechanisms to mitigate the possibility for subsequent errors. Method 500 then proceeds to step 512 where the occurrence of a correctable error is logged.

While the foregoing is directed to the preferred embodiment of the present invention, other and further embodiments of the invention may be devised without departing from the basic scope thereof, and the scope thereof is determined by the claims that follow.

What is claimed is:

1. A method of transferring data in a directory-based shared memory multiprocessor data processing system to a requesting device, comprising the steps of:
    a) accessing, by the requesting device, the data contained in a local memory associated with the requesting device;
    b) determining whether an error condition exists in the data;
    c) if an error condition exists, accessing a directory to determine whether the data is available at a remote memory; and
    d) if the data is available at the remote memory, requesting the data from the remote memory.

2. The method of claim 1, further comprising the steps of:
    e) receiving data from the remote memory; and
    f) supplying the data to the requesting device.

3. The method of claim 1, wherein step d) comprises, placing a request on an interconnect coupling the requesting device and the remote memory.

4. The method of claim 1, further comprising the step of providing the data to the requesting device if step b) determines that no error condition exists.

5. The method of claim 1, wherein the requesting device is selected from one of a memory controller, a processor and any combination thereof.

6. The method of claim 1, further comprising the step of updating the local memory with the data received from the remote memory.

7. The method of claim 1, further comprising the step of logging a data error after determining that an error condition exists.

8. The method of claim 1, further comprising the step of determining the state of the data prior to step a).

9. The method of claim 8, wherein determining the state of the data comprises accessing the directory.

10. The method of claim 1, wherein step c) comprises determining the state of the data.

11. The method of claim 10, wherein the step of determining the state of the data comprises determining whether the data is in a shared state.

12. The method of claim 1, further comprising the steps of:
   e) identifying one or more failing bits located at an address of the local memory containing the data;
   f) writing over one or more bits at the address with one or more bits from the remote memory; and
   g) reading from the address.

13. The method of claim 12, further comprising the steps of:
   h) identifying one or more failing bits contained in the data read at step g); and
   i) determining whether any of the one or more failing bits identified in step h) match one or more of the failing bits identified at step e).

14. The method of claim 13, wherein e) and h) comprise comparing data contained in the local memory to the data received from the remote memory.

15. The method of claim 12, further comprising the steps of:
   h) writing over the data located at an address in the local memory with data from the remote memory;
   i) reading from the address;
   j) determining whether an error condition exists in data read from the address in step i); and
   k) if an error condition exists at step j), determining whether one or more failed bits contained in the data at step b) match one or more failed bits contained in the data at step i).

16. The method of claim 15, further comprising the step of logging error data.

17. A shared memory multiprocessor data processing system, comprising a first node having a first processing unit, a first memory and a directory, a second node having a second processing unit and a second memory, and an interconnect coupling the first and second nodes; wherein the first processing unit is configured to perform the steps of:
   a) accessing data contained in the first memory;
   b) determining whether an error condition exists in the data; and
   c) if an error condition exists, accessing the directory to determine if the data may be resident in another location on the system.

18. The data processing system of claim 17, wherein the first processing unit includes a memory controller configured to perform the steps a)–c).

19. The data processing system of claim 17, wherein the first node and the second node are components of an architecture selected from one of a Non-Uniform Memory Access (NUMA) architecture and a Cache-Only Memory Architecture (COMA).

20. The data processing system of claim 17, wherein the first processing unit is configured to determine the state of the data in step c).

21. The data processing system of claim 17, wherein the first processing unit is configured to access the directory prior to step a) to determine whether the data is located in the first memory.

22. The data processing system of claim 17, wherein the first processing unit comprises a processor and a memory controller, wherein the memory controller is configured to perform steps a)–c) and is further configured to perform the step of:
   d) if no error condition exists, providing the data to the processor.

23. The data processing system of claim 17, wherein at least one of the first node and the interconnect is configured to further perform the step of:
   d) if the data may be resident in another location on the system, requesting the data from the second node.

24. The data processing system of claim 23, wherein at least one of the first node and the interconnect is configured to further perform the steps of:
   e) receiving the data; and
   f) updating the first memory with data received from the second node.

25. The data processing system of claim 24, wherein the first processing unit comprises a memory controller adapted to perform the steps a)–c) and further adapted to compare the data accessed in first memory to the data received from the second node to determine one or more failing bits of the data requested from the first memory.

26. The data processing system of claim 23, wherein at least one of the first node and the interconnect is configured to further perform the steps of:
   e) receiving the data from the second node;
   f) supplying the data received from the second node to the first processing unit;
   g) updating the first memory with data received from the second node; and
   h) if no error condition exists in step b), providing the data to the first processing unit.

27. The data processing system of claim 26, wherein the first processing unit is configured to access the directory prior to step a) to determine whether the data is located in the first memory.

28. A directory-based data processing system having a distributed shared memory, the data processing system comprising:
   a) a first node including at least a first processor, a first memory, a first memory controller and a first directory containing state data for one or more memory blocks of the first memory;
   b) a second node including at least a second processor, a second memory, a second memory controller and a second directory containing state data for one or more memory blocks of the second memory; and
   c) an interconnect connecting the first node and the second node;
wherein the first memory controller is configured to access data contained in the first memory and determine whether an error condition exists in the data and, if an error condition exists, place a request for the data on the interconnect.

29. The directory-based data processing system of claim 28, wherein the first processor and the second processor are components of an architecture selected from one of a Non-Uniform Memory Access (NUMA) architecture and a Cache-Only Memory Architecture (COMA).

30. The directory-based data processing system of claim 28, wherein the first memory controller is adapted to access the first directory to determine the state of the data contained in the first memory prior to accessing the data.

31. The directory-based data processing system of claim 28, wherein the first memory controller is adapted to access the directory to determine whether the first node contains a valid copy of the data prior to placing the request on the interconnect.

32. The directory-based data processing system of claim 28, wherein, if an error condition exists, one or more of the first node, the second node and interconnect is configured to determine whether the data is contained in the second node and, if so, to provide the data to the first node.

33. The directory-based data processing system of claim 28, wherein the first memory controller is further configured to determine whether the error condition is an uncorrectable error or a correctable error.

34. The directory-based data processing system of claim 28, wherein the first memory controller is further configured to identify which bits of the data contained in the first memory include a data error.

35. The directory-based data processing system of claim 28, wherein the first memory controller is further configured to compare the data contained in the fist memory to data received in response to the request placed on the interconnect.

* * * * *